Feb. 29, 1944.　　　E. BUTLER　　　2,343,045
ENGINE SLING
Filed Oct. 3, 1942　　2 Sheets-Sheet 1

INVENTOR.
EDWARD BUTLER
BY George Douglas Jones
ATTORNEY

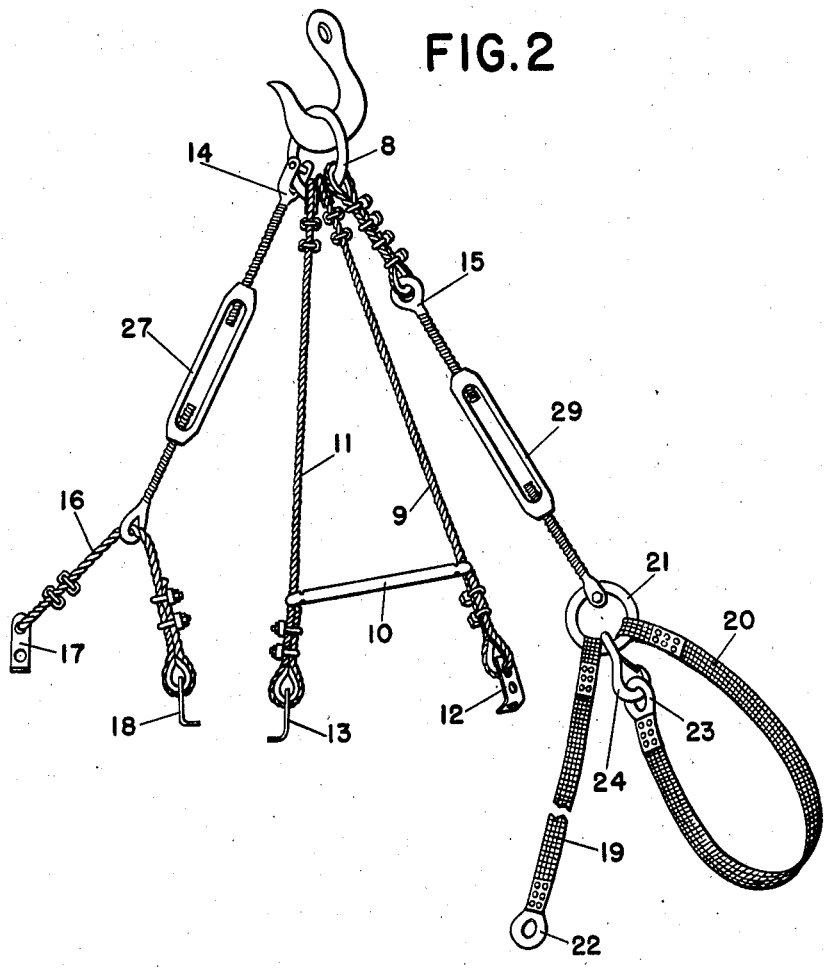

Patented Feb. 29, 1944

2,343,045

UNITED STATES PATENT OFFICE 2,343,045

ENGINE SLING

Edward Butler, Middle River, Md., assignor to The Glenn L. Martin Company, Middle River, Md., a corporation of Maryland Application October 3, 1942, Serial No. 460,715

5 Claims. (Cl. 294—74)

This invention relates to servicing slings, and particularly to servicing slings used to mount and dismount power plants in airplanes.

Present day methods of aircraft construction and servicing call for the independent assembly of motor, motor mount and motor accessories which constitutes the power plant.

The primary object of the present invention is to provide an adjustable sling which may be used to pick up a power plant from its place of assembly and lift it into its place on an airplane.

Another object of the invention is to provide an adjustable sling for installing power plants in airplanes whose longitudinal axes are angularly disposed in respect to the ground upon which the airplanes are resting.

Still another object of the present invention is to provide an adjustable sling for lifting, and holding at any desired angle, a piece of bulky and very delicate equipment whose center of gravity is not located near the center portion of its body.

A still further object of the present invention is to provide an adjustable sling for use in lifting, moving and installing or removing aircraft power plants whereby said power plants can be properly lined up for their attachment with a minimum chance of damage due to handling.

Further and other objects will become apparent from the description of the accompanying drawings which form a part of this disclosure and in which like numerals refer to like parts.

In the drawings:

Fig. 2 shows the sling in more detail.

Figure 1:
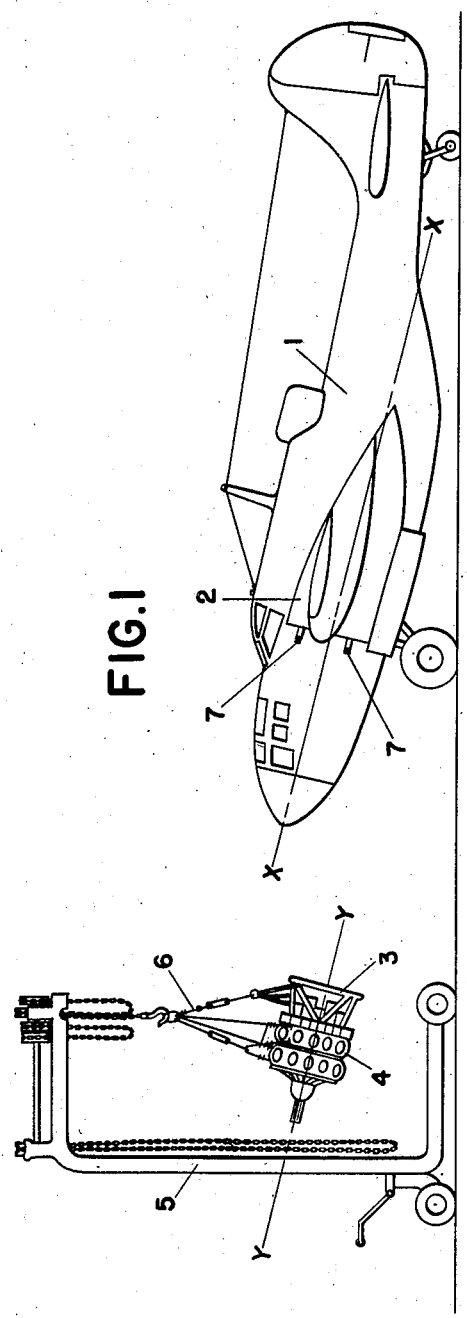
Fig. 1 shows the sling of the present invention being used to install a power plant assembly on an airplane whose longitudinal axis is angularly disposed to the horizontal.

An airplane 1 is shown in Figure 1 with its longitudinal axis indicated by $x$—$x$, at an angle to the horizontal. On the front bulkhead of the engine nacelle 2 are the motor support studs 7 which project forwardly in parallel relationship to the longitudinal axis $x$—$x$.

Shown in front of the airplane is a conventional crane 5 supporting a power plant consisting of a motor mount 3, and a motor 4. The crane supports the power plant by means of the sling of the present invention which is generally indicated by 6. The sling supports the power plant so that its longitudinal axis $y$—$y$ is parallel to the longitudinal axis $x$—$x$ of the airplane. It should be noted that both the longitudinal axis of the airplane and the longitudinal axis of the power plant unit are angularly disposed with respect to the horizontal.

As crane 5 is moved toward the airplane, the power plant unit is held by the sling 6 so that its longitudinal axis $y$—$y$ forms the same angle with the ground line as does the longitudinal axis $x$—$x$ of the airplane. Thus the holes on the motor mount 3 line-up with studs 7, and the power plant unit may be easily and quickly attached to the airplane without stripping the threads of the studs 7 and without damaging the motor accessories or the fire-wall of nacelle 2.

Figure 2 shows the sling, generally indicated by 6 in Figure 1, in greater detail. The sling has a terminal member, ring 8. Connected to this ring are a pair of supporting cables 9 and 11 which extend from ring 8 to the power plant. At the free ends of the cables 9 and 11 are the link members 12 and 13 for attaching the said cables to the power plant. The cables 9 and 11 are attached to the power plant through link members 12 and 13 substantially in the plane of the center of gravity of said power plant. For example, when the power plant to be lifted by the sling is a double row, radial air-cooled type motor, the link members 12 and 13 can be attached to it by inserting them over rocker arm pin bolts situated in the cylinder heads of the rear cylinder bank. When the link members 12 and 13 are attached to two rocker arm pin bolts in the cylinder heads of the rear bank of a double row radial air-cooled type motor, the cables 9 and 11 when suspended from ring 8 will support the power plant substantially in the plane of the center of gravity of said power plant. A spacer bar 10 may be used to spread the cables 9 and 11 apart, to facilitate locating the link member on the motor.

Also connected to ring 8 are the adjustable supports 14 and 15 which extend to points forwardly of and rearwardly of the center of gravity of said power plant which has been previously described as lying substantially in the plane of the cylinder heads of the rear bank of a double row air-cooled radial motor when that type of motor is used in the power plant.

Cable 16 which is preferably connected at its mid-point to the forward adjustable support, is attached to the forward portion of the power plant through the link members 17 and 18. These link members can be inserted over extensions of the rocker arm pin bolts found in the cylinder heads of the front bank of a double row air-cooled radial motor. They can also be attached to any other projection on the power plant forward of its center of gravity.

Straps 19 and 20 which are connected to the rear adjustable support through ring 21 by means of ring portions 22 and 23 and snap ring 24, are attached to the rear portion of the power plant. Inasmuch as, the rear portion of the power plant usually consists of a motor mount, the straps 19 and 20 are connected to it by being wrapped around the legs of said motor mount.

In contemplation of a power plant including a double row air-cooled type motor and a motor mount secured thereto, it should be repeated that the cables 9 and 11 from ring 8 would extend through link members 12 and 13 to the cylinder heads of the rear bank of said motor or to the plane of points on said motor that are substantially at its center of gravity. Thus, by operating the turnbuckles 27 and 29, the axis of the power plant may be tilted as desired while being supported from ring 8.

Due to its construction, the sling is designed to take advantage of the common features of all power plants and thus may be quickly and easily attached to any power plant.

It is to be understood that certain changes, alterations, modifications and substitutions can be made without departing from the spirit and scope of the appended claims.

I claim as my invention:

1. A power plant mounting sling comprising a terminal member, supporting members extending from said terminal member to said power plant, securing means on the ends of said supporting members for attachment to the power plant substantially in the plane of the center of gravity thereof, adjustable supports extending from said terminal member to points forwardly of and rearwardly of said center of gravity, means to secure said adjustable supports to the forward and rear portions of the power plant, whereby the axis of the power plant may be tilted while being supported from said terminal member.

2. A power plant mounting sling comprising a terminal member, a pair of supporting members extending from said terminal member to said power plant, a spacing member for holding said supporting members in spaced relationship to each other, securing means on the ends of said supporting members for attaching said supporting members to said power plant at points on said power plant substantially in the plane of the center of gravity of said power plant, an adjustable support extending from said terminal member to a portion forward of the center of gravity of said power plant, means for securing said adjustable support to said forward portion of said power plant, an adjustable support extending from said terminal member to a portion rearward of the center of gravity of said power plant, means for securing said adjustable support to the rearward portion of said power plant, whereby the axis of the power plant may be tilted while being supported from said terminal member.

3. A power plant mounting sling comprising a terminal member, a pair of supporting members extending from said terminal member to said power plant, securing means on the ends of said supporting members for attaching said supporting members to said power plant at points on said power plant substantially in the plane of the center of gravity of said power plant, an adjustable support extending from said terminal member to a portion forward of the center of gravity of said power plant, means for securing said adjustable support to said forward portion of said power plant, an adjustable support extending from said terminal member to a portion rearward of the center of gravity of said power plant, means for securing said adjustable support to the rearward portion of said power plant, whereby the axis of the power plant may be tilted while being supported from said terminal member.

4. A power plant mounting sling comprising a main supporting member secured to the power plant substantially at the center of gravity, supports secured to the forward and rearward portions of the power plant respectively, the length of said supports being adjustable, whereby the axis of the power plant may be adjusted while being suspended by the main supporting member.

5. A power plant mounting sling comprising a terminal member, a pair of supporting members extending from said terminal member to said power plant, securing means on the ends of said supporting members for attachment to said power plant at points thereon substantially in the plane of the center of gravity thereof, adjustable supports extending from said terminal member to a portion forwardly of and rearwardly of the center of gravity of said power plant respectively, and securing means therefor, whereby the axis of the power plant may be adjusted while being supported from said terminal member.

EDWARD BUTLER.